United States Patent
Heitkamp et al.

(10) Patent No.: US 7,016,995 B1
(45) Date of Patent: Mar. 21, 2006

(54) SYSTEMS AND METHODS FOR PREVENTING DISRUPTION OF ONE OR MORE SYSTEM BUSES

(75) Inventors: Ross Heitkamp, Mountain View, CA (US); Antony Chatzigianis, San Carlos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 458 days.

(21) Appl. No.: 10/338,678

(22) Filed: Jan. 9, 2003

(51) Int. Cl.
*G06F 13/00* (2006.01)
*G06F 13/372* (2006.01)

(52) U.S. Cl. .................... 710/110; 710/117; 710/124
(58) Field of Classification Search ............. 710/110, 710/117, 124
See application file for complete search history.

(56) References Cited

U.S. PATENT DOCUMENTS

| | | | | |
|---|---|---|---|---|
| 3,859,655 A | * | 1/1975 | Van Duuren | 341/68 |
| 4,750,115 A | * | 6/1988 | Sekiya et al. | 709/208 |
| 5,119,373 A | * | 6/1992 | Fredricsson et al. | 370/458 |
| 5,289,583 A | * | 2/1994 | Fischer et al. | 710/241 |
| 5,412,795 A | * | 5/1995 | Larson | 710/58 |
| 5,499,345 A | * | 3/1996 | Watanabe | 710/117 |
| 5,797,020 A | * | 8/1998 | Bonella et al. | 710/240 |
| 6,185,639 B1 | * | 2/2001 | Kailash et al. | 710/48 |
| 2003/0135678 A1 | * | 7/2003 | Andre | 710/243 |
| 2003/0174724 A1 | * | 9/2003 | Olson et al. | 370/420 |

* cited by examiner

*Primary Examiner*—Rehana Perveen
*Assistant Examiner*—Jeremy S. Cerullo
(74) *Attorney, Agent, or Firm*—Harrity Snyder, LLP (57) ABSTRACT

A system prevents disruption of one or more system buses. The system monitors communication on the one or more system buses during an input mode and an output mode and detects changes between the input mode and the output mode. The system determines whether a predetermined time period has elapsed after a change from the input mode to the output mode and changes from the output mode to the input mode when the predetermined time period has elapsed after a change from the input mode to the output mode.

25 Claims, 7 Drawing Sheets

SYSTEMS AND METHODS FOR PREVENTING DISRUPTION OF ONE OR MORE SYSTEM BUSES

BACKGROUND OF THE INVENTION

1. Field of the Invention

The present invention relates generally to data processing and, more particularly, to systems and methods for preventing disruption of one or more system buses.

2. Description of Related Art

Master-slave systems have been in existence for years. In such systems, a master device usually controls the operation of one or more slave devices. For example, the master device might cause the slave devices to perform certain operations or functions required by the system. In some systems, the master device connects to the slave devices via one or more dedicated wires. A problem with such systems is that the number of connecting wires can become unmanageable.

In other systems, the master device connects to the slave devices via a bus. Bus systems, like these, have proven to be more efficient than their counterpart dedicated wiring systems. A concern in master-slave bus systems is what to do when the master device or the bus fails. Oftentimes, such failures can take down the entire system until the master device or bus can be replaced.

To minimize system reliance on the operation of a single master device or bus, redundant master devices and buses can be used. In this case, one master device typically acts as the system master and the other master device acts as a backup in case of failure to the system master. The master device usually communicates with the slave devices over one of the buses. If a failure occurs on this bus, the master device simply switches to communicate over the other bus.

A problem that can occur in such a redundant system is that a failing slave device might cause disruption of both buses. In this case, the entire system might be taken down until the failure can be diagnosed and the failing component(s) replaced.

As a result, there exists a need for mechanisms for preventing disruption of one or more system buses.

SUMMARY OF THE INVENTION

Systems and methods consistent with the principles of the invention address this and other needs by providing mechanisms that prevent the disruption of one or more system buses in a redundant master-slave system. Using such mechanisms, the failure of a system component can be localized, thereby preventing the failure from disrupting one or more of the system buses.

One aspect consistent with the principles of the invention includes a system that prevents disruption of one or more system buses. The system monitors communication on the one or more system buses during an input mode and an output mode and detects changes between the input mode and the output mode. The system determines whether a predetermined time period has elapsed after a change from the input mode to the output mode and changes from the output mode to the input mode when the predetermined time period has elapsed after a change from the input mode to the output mode.

In another aspect, a slave device connects to at least one master device via one or more system buses. The slave device includes at least one bus driver, bus logic, and watchdog logic. The at least one bus driver communicates on the one or more system buses, receiving signals during an input mode and transmitting signals during an output mode. The bus logic is configured to identify transitions between the input mode and the output mode. The watchdog logic is configured to determine whether a predetermined time period elapses after a transition from the input mode to the output mode, and cause the at least one bus driver to stop further transmissions on the one or more system buses when the predetermined time period elapses after a transition from the input mode to the output mode.

In yet another aspect, a system includes multiple buses, master devices, and slave devices. At least one of the slave devices includes multiple bus drivers, bus logic, and watchdog logic. The bus drivers communicate on the buses during multiple operational modes, receiving signals from the buses during an input mode of the operational modes and transmitting signals on the buses during an output mode of the operational modes. The bus logic is configured to monitor the operational modes of the bus drivers and detect changes between the input mode and the output mode. The watchdog logic is configured to determine whether a predetermined time period elapses after a change from the input mode to the output mode and cause at least one of the bus drivers to cease further transmissions when the predetermined time period elapses after a change from the input mode to the output mode.

In a further aspect, a network device includes multiple system buses, multiple routing engines, multiple controllers connected to the routing engines and the system buses, and multiple slave devices connected to the system buses. At least one of the slave devices includes multiple bus drivers, bus logic, and watchdog logic. The bus drivers communicate on the system buses during multiple operational modes, receiving signals from the system buses during an input mode of the operational modes and transmitting signals on the system buses during an output mode of the operational modes. The bus logic includes multiple independent state machines that control operation of the bus drivers, and a watchdog state machine that monitors signals from the state machines to detect changes between the input mode and the output mode. The watchdog logic changes the operational mode of at least one of the bus drivers to the input mode when a predetermined time period elapses after a change from the input mode to the output mode.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with principles of the invention prevent disruption of one or more system buses in a redundant master-slave system. Through interaction of one or more state machines and one or more watchdog mechanisms, the failure of a system component can be localized, thereby preventing the failure from disrupting the system bus(es).

Exemplary System Overview

Figure 1:
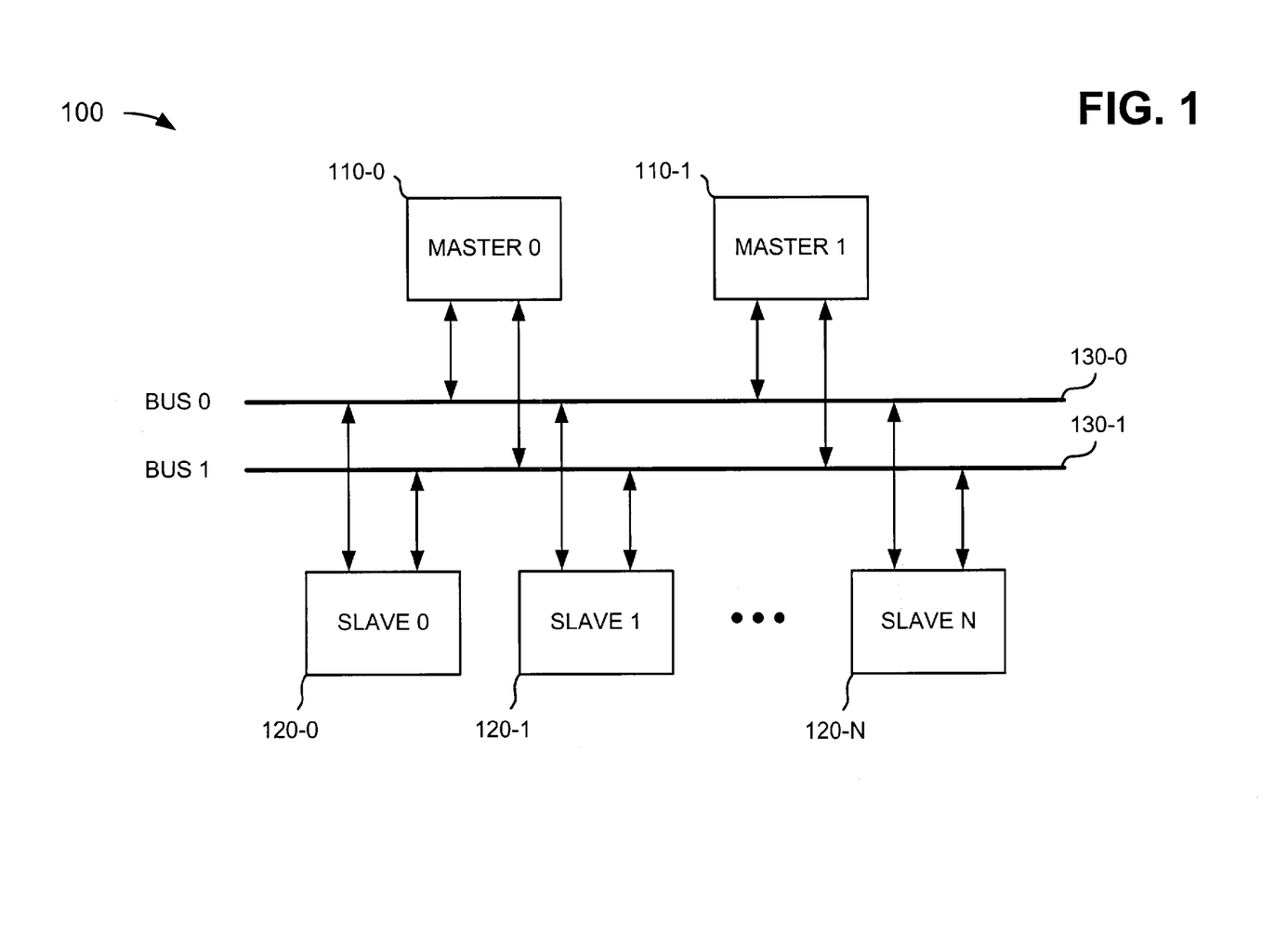
FIG. 1 is a block diagram illustrating an exemplary system in which systems and methods consistent with the principles of the invention may be implemented.

FIG. 1 is a block diagram illustrating an exemplary system 100 in which systems and methods consistent with the principles of the invention may be implemented. In one implementation consistent with the principles of the invention, system 100 may be configured as part of a network device, such as a router or a switch. For example, system 100 may include master devices 110-0 and 110-1 (collectively referred to as master devices 110) and slave devices 120-0, 120-1, . . . , 120-N (collectively referred to as slave devices 120) connected to buses 130-0 and 130-1 (collectively referred to as buses 130). While two master devices 110 and two buses 130 are shown in FIG. 1, more or fewer master devices 110 and buses 130 may be used in other implementations consistent with the principles of the invention.

In one implementation, buses 130 may include chassis management buses that transport low level commands and signals between master devices 110 and slave devices 120. Buses 130-0 and 130-1 may be redundant buses, such that one of buses 130-0 and 130-1 is, at any given time, the active bus and the other one of buses 130-0 and 130-1 is the standby bus. During operation, master devices 110 may transmit commands and other signals on both the active bus and the standby bus. For example, signals on the standby bus may be used for diagnostic purposes (e.g., to test the operation of the standby bus and/or slave devices 120).

Master devices 110 may include redundant controllers. Each of master devices 110 connects to both buses 130. In an implementation where system 100 is located within a network device, master devices 110 may also connect to respective routing engines. Master devices 110 may provide low level commands to slave devices 120 via buses 130. The low level commands may include, without limitation, reset, clock selection, power up, and power down commands.

Slave devices 120 may include system interfaces, processing devices, or other types of devices. Slave devices 120 may receive commands from master devices 110 and respond to these commands to master devices 110 via buses 130.

Exemplary Master Device Configuration

Figure 2:
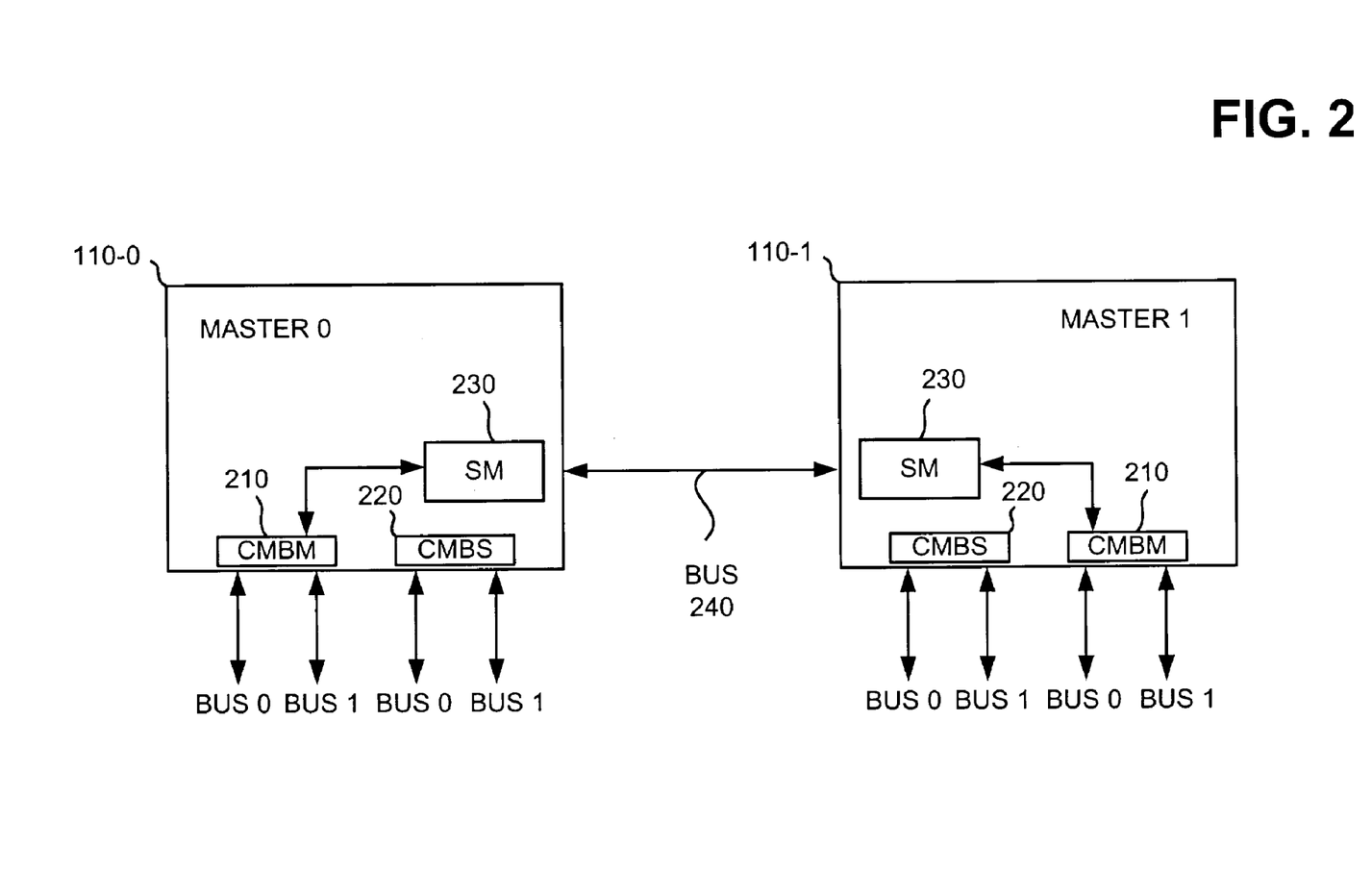
FIG. 2 is an exemplary diagram of the master devices of FIG. 1 according to an implementation consistent with the principles of the invention.

FIG. 2 is an exemplary diagram of master devices 110 according to an implementation consistent with the principles of the invention. Master devices 110 may include chassis management bus masters (CMBMs) 210, chassis management bus slaves (CMBSs) 220, and state machine 230. CMBM 210 may include bus drivers and processing logic for controlling communication on buses 130. CMBM 210 may selectively connect to one of buses 130 as determined by state machine 230.

CMBS 220 may include bus drivers and processing logic that responds to commands from the respective one of master devices 110. For example, CMBS 220 permits the respective one of master devices 110 to send commands to itself or the other one of master devices 110. This allows master devices 110 to verify their own operation and their connection to buses 130.

State machines 230 may make decisions regarding system and bus mastership. State machines 230 may connect via system and bus mastership bus 240. In one implementation, bus 240 includes eight conductors (e.g., four conductors used for transmissions in either direction). For example, two conductors may be used to indicate that one of master devices 110 is ready to be system master (i.e., the master device is booted, its software is running, and it is capable of operating system 100). One conductor may be used to indicate that a master device believes that it is the system master. One additional conductor may be used to indicate which of buses 130 the system master is using. Parity may be used for added reliability.

State machines 230 may implement processes for determining system and bus mastership. For example, if master device 110-1 is ready to be system master and master device 110-0 is not, then master device 110-1 becomes system master. If both master devices 110 are ready to become system master and neither is currently system master, then both master devices 110 may attempt to take system mastership. In this case, one of master devices 110 may be programmed to back down and permit the other one of master devices 110 to become system master.

The system master selects one of buses 130 to use, as the active bus, and informs the other one of master devices 110 of the selection. The non-system master (i.e., the one of master devices 110 that does not become system master) may use the non-selected one of buses 130 (i.e., the standby bus) to communicate with slave devices 120. The non-system master may be permitted to perform non-disruptive transactions with slave devices 120 using the standby bus. The non-disruptive transactions might include, for example, checking the operational status of slave devices 120 and the standby bus, reading the reset state of slave devices 120, monitoring bus performance, executing diagnostics, and controlling functions unique to that master.

Exemplary Slave Device Configuration

Figure 3:
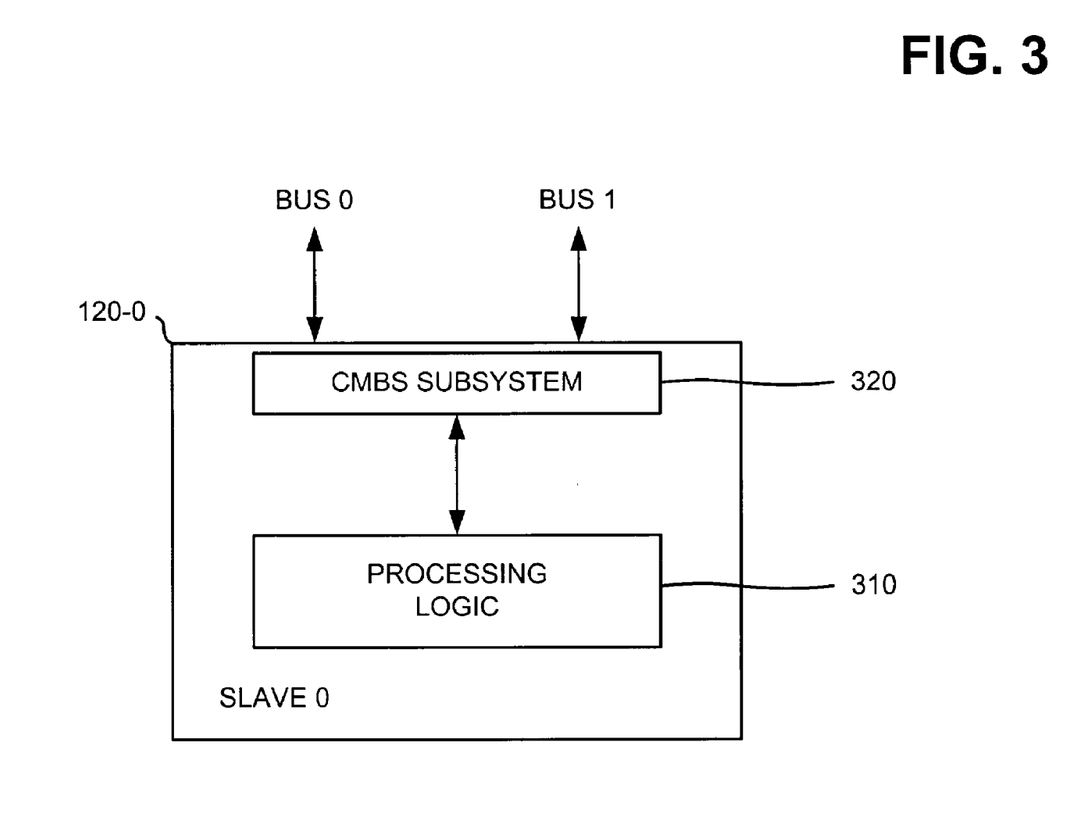
FIG. 3 is an exemplary diagram of a slave device of FIG. 1 according to an implementation consistent with the principles of the invention.

FIG. 3 is an exemplary diagram of slave device 120-0 according to an implementation consistent with the principles of the invention. Other slave devices 120-1 through 120-N can be configured similarly. Slave device 120-0 may include processing logic 310 and CMBS subsystem 320. Processing logic 310 may include logic that processes data received by system 100 and/or data for transmission from system 100. CMBS subsystem 320 may process commands from master devices 110 and include mechanisms that prevent failures in slave device 120-0 from simultaneously disabling both buses 130.

Figure 4:
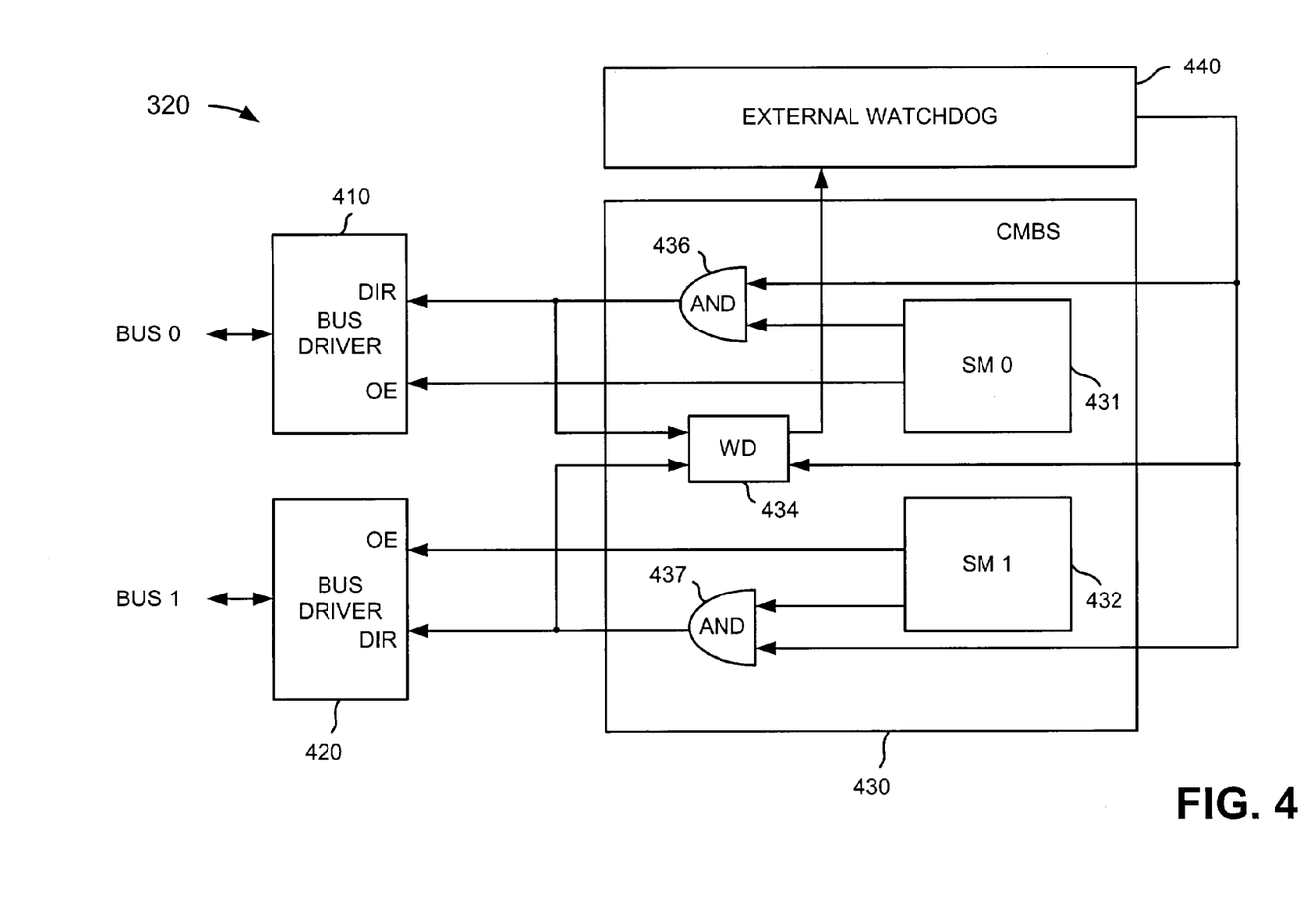
FIG. 4 is an exemplary diagram of a portion of the chassis management bus slave of FIG. 3 according to an implementation consistent with the principles of the invention.

FIG. 4 is an exemplary diagram of a portion of CMBS subsystem 320 according to an implementation consistent with the principles of the invention. CMBS subsystem 320 may include bus drivers 410 and 420, CMBS 430, and external watchdog logic 440. Bus driver 410 may include a transceiver that connects to bus 130-0. Bus driver 410 may transmit signals between bus 130-0 and CMBS 430. Bus driver 410 may receive two control signal inputs: direction (DIR) and output enable (OE). The direction signal may specify whether bus driver 410 operates in an input mode or an output mode. In one implementation, a low direction signal identifies the input mode. The output enable signal may specify whether bus driver 410 may drive signals (transmit or receive) on bus 130-0. In one implementation, a high output enable signal identifies a disabled bus driver 410 (i.e., bus driver 410 cannot transmit or receive on bus 130-0).

Bus driver 420 may include a transceiver that connects to bus 130-1. Bus driver 420 may transmit signals between bus 130-1 and CMBS 430. Bus driver 420 may receive two control signal inputs: direction (DIR) and output enable (OE) that control the operation of bus driver 420 as described above with respect to bus driver 410.

CMBS 430 may include bus logic, possibly in the form of a monolithic programmable device, such as a field programmable gate array (FPGA). In one implementation, CMBS 430 includes state machines (SMs) 431 and 432, watchdog (WD) logic 434, and logic gates 436 and 437. State machines 431 and 432 may include independent state machines that correspond to buses 130-0 and 130-1, respectively. State machines 431 and 432 may generate the control signals (i.e., direction and output enable) for controlling the operation of bus drivers 410 and 420, respectively. The use of redundant state machines 431 and 432 may be beneficial from reliability, redundancy, and diagnostic standpoints. This permits separate independent transactions to occur on each of buses 130. While bus 130-0 is in use, for example, bus 130-1 may be tested.

Watchdog logic 434 may include a state machine that monitors signals generated by state machines 431 and 432. For example, watchdog logic 434 may monitor the direction signals from CMBS 430 to make sure that the directions are not set so that bus drivers 410 and 420 transmit signals out onto buses 130 for more than a predetermined period of time. Watchdog logic 434 may monitor the direction signals outside of CMBS 430 to detect stuck bits on the conductor connecting to the direction inputs of bus drivers 410 and 420. When watchdog logic 434 detects changes in the direction signals within the predetermined period, watchdog logic 434 sends signals to external watchdog logic 440. For example, watchdog logic 434 may generate toggle signals (e.g., toggle high and toggle low signals) to indicate the changes in direction between input and output modes.

External watchdog logic 440 may include a state machine that monitors the receipt of the toggle signals from watchdog logic 434. External watchdog logic 440 may include its own timer that determines the period of time during which it expects to receive one or more toggle signals from watchdog logic 434. When external watchdog logic 440 fails to receive a toggle signal within the time period, external watchdog logic 440 may assert a disable signal (e.g., a logic low signal) that it provides to logic gates 436 and 437 of CMBS 430.

Logic gates 436 and 437 may include AND gates that perform logical AND operations on the disable signal from external watchdog logic 440 and the direction signals from state machines 431 and 432, respectively. The disable signal from external watchdog logic 440, when asserted, may cause logic gates 436 and 437 to generate direction signals for causing bus drivers 410 and 420, respectively, to switch to the input mode, thereby preventing bus drivers 410 and 420 from driving signals onto buses 130-0 and 130-1, respectively.

In another implementation consistent with the principles of the invention, logic gates 436 and 437 may perform logical operations on signals other than the direction signals. For example, logic gates 436 and 437 may logically combine the disable signal with the output enable signals to disable bus drivers 410 and 420 when appropriate.

Watchdog logic 434 may also receive the disable signal from external watchdog logic 440. The disable signal from external watchdog logic 440, when asserted, may cause watchdog logic 434 to take itself offline, thereby preventing the sending of possibly erroneous toggle signals to external watchdog logic 440.

In one implementation, external watchdog logic 440 monitors the status of both buses 130. If external watchdog logic 440 fails to receive a toggle signal relating to either of buses 130, external watchdog logic 440 may cause slave device 120-0 to stop transmitting on both buses. In another implementation, external watchdog logic 440 monitors only the active bus (i.e., the one of buses 130 that is used by the system master).

The operation of external watchdog logic 440 may be latching or non-latching. This means that when a triggering event occurs (e.g., external watchdog logic 440 fails to receive a toggle signal within the time period), external watchdog logic 440 may "latch" to prevent CMBS 430 from disrupting buses 130 until slave device 120-0 is power cycled. Alternatively, external watchdog logic 440 may be "non-latching" to prevent CMBS 430 from disrupting buses 130 until the signals monitored by watchdog logic 434 meet the established criteria. CMBS 430 may, thereafter, be permitted to transmit signals on buses 130 again.

Exemplary Processing

Figure 5:
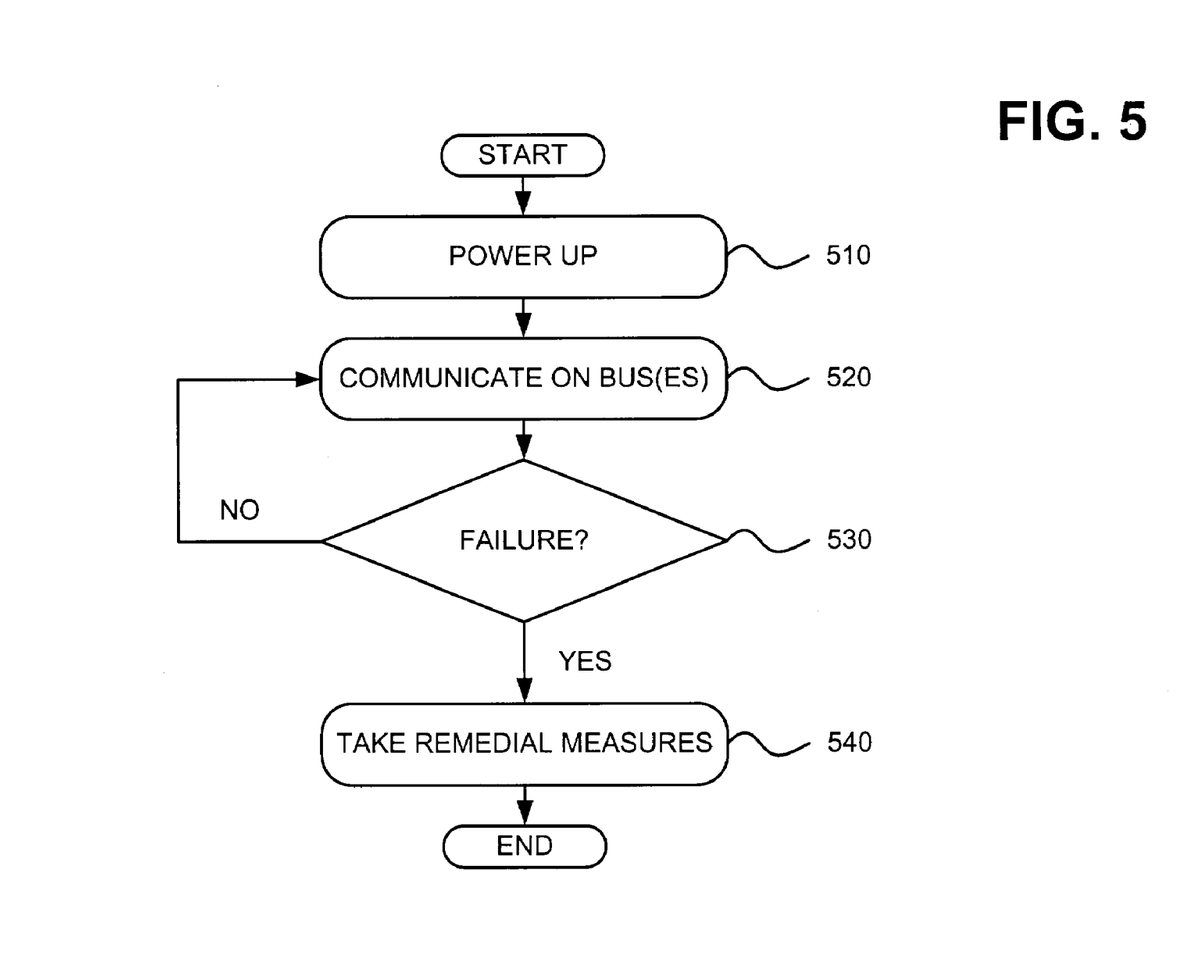
FIG. 5 is a flowchart of exemplary processing by the slave device of FIG. 3 according to an implementation consistent with the principles of the invention.

FIG. 5 is a flowchart of exemplary processing by a slave device 120-0 according to an implementation consistent with the principles of the invention. The processing by slave device 120-0 will be described with respect to the features of FIG. 4. Slave devices 120-1, . . . , 120-N may perform similar processes.

Processing may begin with the powering up of slave device 120-0 (act 510). During power up, state machines 431 and 432 may cause the output enable signals to go high and the direction signals to go low. The high output enable signals disable bus drivers 410 and 420. The low direction signals cause slave device 120-0 to enter the input mode, thereby further preventing slave device 120-0 from transmitting on, and possibly disrupting, buses 130.

Slave device 120-0 may then enter a processing mode where it communicates on the active bus (act 520). When communicating on the active bus, slave device 120-0 may, for example, receive signals from the active bus (input mode) and transmit signals on the active bus (output mode). Slave device 120-0 may also communicate on the standby bus (act 520).

Figure 6:
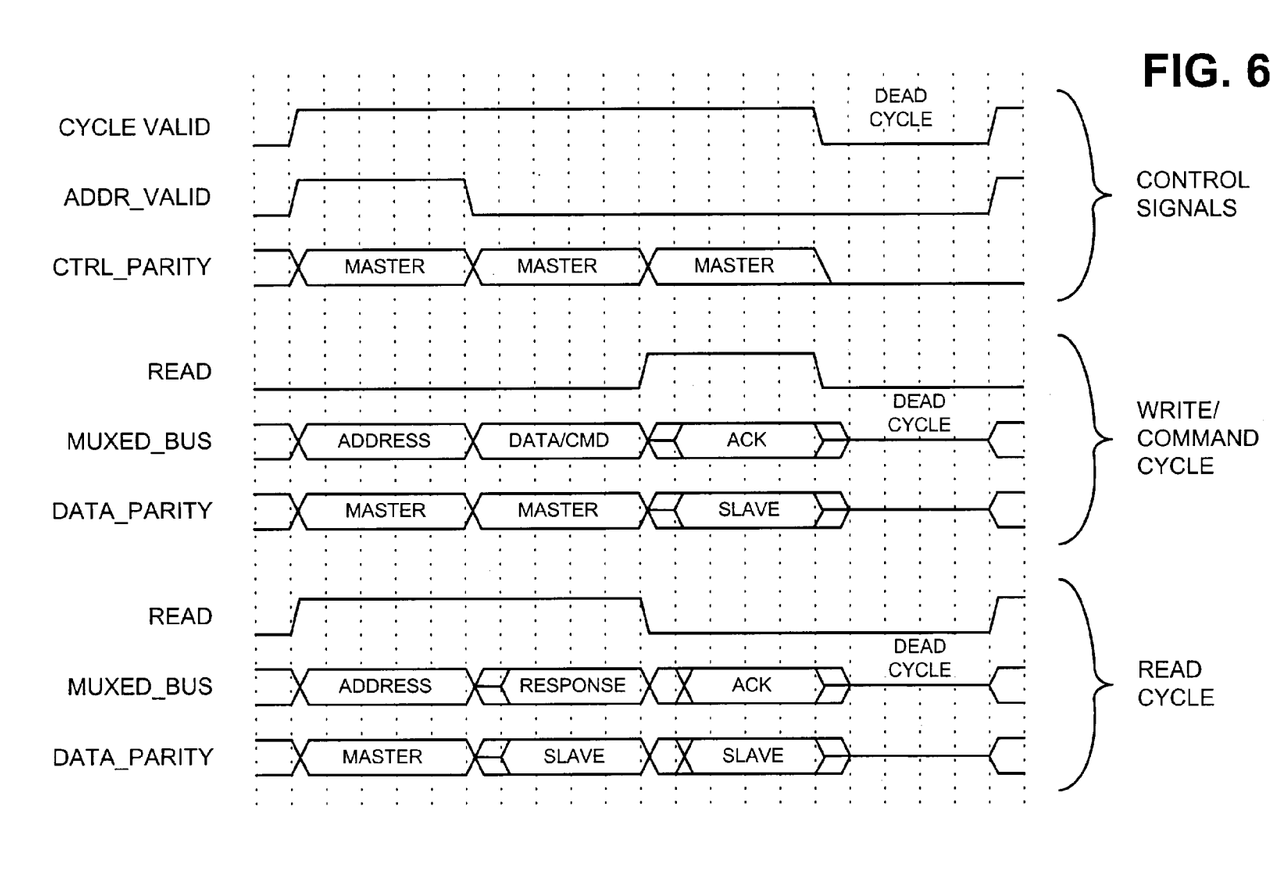
FIG. 6 is an exemplary diagram of a typical bus cycle that may occur in the system of FIG. 1.

Communication on buses 130 may occur during a number of bus cycles. FIG. 6 is an exemplary diagram of a typical bus cycle that may occur on one or both of buses 130. There are four phases of the bus cycle: address, data, acknowledge, and no-op (no operation). During the address phase, the system master sends address information to slave devices 120. A slave device may respond to data and/or commands from the system master that accompany its address. During the data phase, the system master may send data and commands to a slave device for a write operation. For a read operation, a slave device may send a response to the system master. During the acknowledgement phase, a slave device sends an acknowledgement signal to the system master. During the no-op phase, no bus communication occurs.

Typically, slave devices 120 are in the input mode, watching signals on buses 130. When a slave device recognizes its address on a bus, it determines whether the communication includes a read or write command from the system master. When it is a write command, the slave device receives data from the bus and transmits an acknowledgement signal. When it is a read command, the slave device transmits data on the bus and then transmits an acknowledgement signal. Parity may also be used for added reliability.

Returning to FIG. 5, slave device 120-0 may regularly monitor its status to determine whether a failure has occurred (act 530). While act 530 is shown as occurring after act 520, act 530 may occur before or during act 520 in implementations consistent with the principles of the invention. When a failure occurs, slave device 120-0 may take remedial measures to prevent simultaneous disruption of both buses 130 (act 540).

Several types of failures may occur and the remedial actions taken may differ. For example, CMBS 430 may initially fail to program. When this occurs, the direction and output enable signals may all float high. This causes bus drivers 410 and 420 to tri-state, thereby removing slave device 120-0 from buses 130. As a result, slave device 120-0 cannot disrupt buses 130.

It may also be possible for an electrostatic discharge to occur and short circuit all of the outputs of CMBS 430. When this occurs, the direction and output enable signals may all go low. Low output enable signals may enable bus drivers 410 and 420 but low direction signals may cause bus drivers 410 and 420 to enter the input mode. This state permits slave device 120-0 to receive signals from buses 130, but not transmit signals on buses 130. As a result, slave device 120-0 cannot disrupt buses 130.

Figure 7:
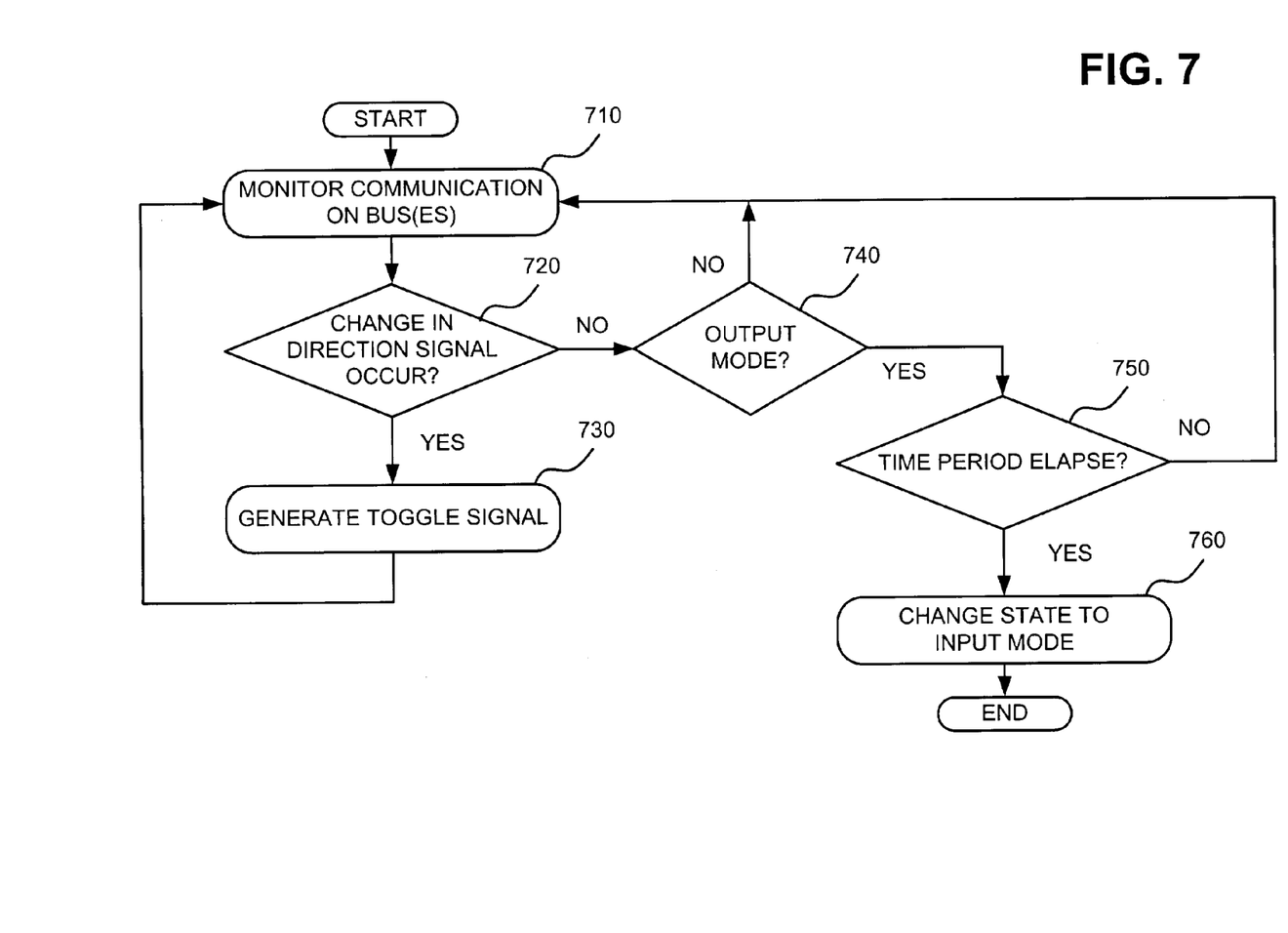
FIG. 7 is a flowchart of exemplary processing for preventing disruption of the buses of FIG. 1 according to an implementation consistent with the principles of the invention.

It may also be possible for an internal failure to occur within CMBS 430. When this occurs, the processing of FIG. 7 may be performed. FIG. 7 is a flowchart of exemplary processing for preventing disruption of buses 130 when an internal failure occurs within CMBS 430. Processing may begin with watchdog logic 434 monitoring the communication on the active bus and, possibly, the standby bus (act 710). For example, watchdog logic 434 may monitor the mode (input or output) in which slave device 120-0 operates. To do this, watchdog logic 434 of slave device 120-0 may monitor, for example, the direction signals from state machines 431 and 432. During normal operation, the direction signals do not indicate the output mode for more than a predetermined period of time. When watchdog logic 434 detects a change in the direction signal(s), watchdog logic 434 generates a high or low toggle signal that it sends to external watchdog logic 440 (acts 720 and 730). Watchdog logic 434 may then continue to monitor the communication on the active bus and, possibly, the standby bus (act 710).

When the direction signal(s) identify the output mode, external watchdog logic 440 determines whether a predetermined time period has elapsed (acts 740 and 750). The predetermined time period may be programmable. When the time period has not elapsed, processing continues at act 710 with the continued monitoring of communication on the active bus and, possibly, the standby bus. If the time period elapses, however, external watchdog logic 440 may change the state of slave device 120-0 to the input mode (acts 750 and 760). For example, external watchdog logic 440 may assert a disable signal that it sends to CMBS 430. The disable signal may be combined with the direction signals via logical AND operations to prevent bus drivers 410 and 420 from transmitting signals on buses 130. The disable signal may also cause watchdog logic 434 to be taken offline for a period of time. As a result, slave device 120-0 cannot disrupt buses 130.

Returning to FIG. 5, it may also be possible for a gate or another component within CMBS 430 to fail. For example, one of state machines 431 and 432 may fail to cause erroneous states of the direction and/or output enable signals. When this occurs, watchdog logic 434 may detect the failure and processing may occur similar to the situation described above with regard to the processing of FIG. 7. In the situation where watchdog logic 434 does not detect the failure, slave device 120-0 may cause disruption on the corresponding one of buses 130. Because state machines 431 and 432 are independent, no disruption will occur, however, on the other one of buses 130.

It may also be possible for CMBS 430 to fail and cause the direction signals to change the state of slave device 120-0 to the output mode and the output enable to enable bus drivers 410 and 420. The chances that both state machines 431 and 432 fail at the same time are very slim, however. When this occurs, watchdog logic 434 may detect the failure and processing may occur similar to the situation described above with regard to the processing of FIG. 7. Alternatively, additional gates (not shown) may be used to force slave device 120-0 to the input mode.

CONCLUSION

Systems and methods consistent with principles of the invention prevent the simultaneous disruption of the system buses in a redundant master-slave system. Through interaction of one or more state machines and one or more watchdog mechanisms, the failure of a system component can be localized, thereby preventing the failure from disrupting both of the system buses.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, although described in the possible context of a routing system, concepts consistent with the principles of the invention can be implemented in any system, device, or chip that communicates with another system, device, or chip via one or more buses.

Further, certain portions of the invention have been described as "logic" that performs one or more functions. This logic may include hardware, such as an application specific integrated circuit, software, or a combination of hardware and software.

Also, while series of acts have been described with regard to the flowcharts of FIGS. 5 and 7, the order of the acts may differ in other implementations consistent with the principles of the invention. Further, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method, performed by a device, for preventing disruption of one or more system buses, comprising:
monitoring, by the device, communication on the one or more system buses during an input mode and an output mode, the device being adapted to transmit a signal on at least one of the one or more system buses during the input mode and receive a signal on at least one of the one or more system buses during the output mode;
detecting changes between the input mode and the output mode;
determining whether a predetermined time period has elapsed after a change from the input mode to the output mode; and
changing from the output mode to the input mode when the predetermined time period has elapsed after a change from the input mode to the output mode.

2. The method of claim 1, wherein the monitoring communication on the one or more system buses includes:
monitoring direction of communication on the one or more system buses.

3. The method of claim 2, wherein the monitoring direction of communication on the one or more system buses includes:
identifying receipt of signals from the one or more system buses during the input mode, and
identifying transmission of signals on the one or more system buses during the output mode.

4. The method of claim 1, wherein the detecting changes between the input mode and the output mode includes:
generating toggle signals that identify transitions between the input mode and the output mode.

5. The method of claim 4, wherein the toggle signals reset the predetermined time period.

6. The method of claim 1, wherein the one or more system buses include two or more system buses; and
wherein the monitoring communication on the one or more system buses includes:
monitoring communication on the two or more system buses.

7. The method of claim 1, wherein the one or more system buses include an active bus and at least one standby bus; and
wherein the monitoring communication on the one or more system buses includes:
monitoring communication on the active bus.

8. A system for preventing disruption of one or more buses, comprising:
means for monitoring direction of communication on the one or more buses, signals being received during an input direction of communication and signals being transmitted during an output direction of communication;
means for identifying changes from the input direction to the output direction;
means for determining whether a predetermined time period elapses after a change from the input direction to the output direction; and
means for changing from the output direction to the input direction when the predetermined time period elapses after a change from the input direction to the output direction.

9. A slave device connected to at least one master device via one or more system buses, comprising:
at least one bus driver for communicating on the one or more system buses, the at least one bus driver receiving signals during an input mode and transmitting signals during an output mode;
bus logic configured to identify transitions between the input mode and the output mode; and
watchdog logic configured to:
determine when a predetermined time period elapses after a transition from the input mode to the output mode, and
cause the at least one bus driver to transition from the output mode to the input mode when the predetermined time period elapses after a transmission from the input mode to the output mode.

10. The slave device of claim 9, wherein the bus logic is further configured to:
generate toggle signals that identify the transitions between the input mode and the output mode, and
send the toggle signals to the watchdog logic.

11. The slave device of claim 10, wherein the toggle signals reset the predetermined time period.

12. The slave device of claim 9, wherein the one or more system buses include two or more system buses and the at least one bus driver includes two or more bus drivers; and
wherein when identifying transitions between the input mode and the output mode, the bus logic is configured to:
monitor when the two or more bus drivers operate in the input mode and the output mode.

13. The slave device of claim 9, wherein the one or more system buses include an active bus and a standby bus and the at least one bus driver includes a first bus driver associated with the active bus and a second bus driver associated with the standby bus; and
wherein when identifying transitions between the input mode and the output mode, the bus logic is configured to:
monitor when the first bus driver operates in the input mode and the output mode.

14. The slave device of claim 9, wherein the bus logic includes:
a first state machine configured to control operation of a first bus driver of the at least one bus driver, and
a second state machine configured to control operation of a second bus driver of the at least one bus driver, the second state machine being independent of the first state machine.

15. The slave device of claim 14, wherein the first and second state machines generate direction signals that control whether the first and second bus drivers operate in the input mode or the output mode.

16. The slave device of claim 15, wherein the bus logic further includes:
a watchdog state machine configured to monitor the direction signals from the first and second state machines.

17. The slave device of claim 15, wherein the watchdog logic is configured to assert a disable signal when the predetermined time period elapses after a change from the input mode to the output mode; and
wherein the bus logic further includes:
first and second logic gates configured to perform logical operations on the disable signal and the direction signals to control whether the first and second bus drivers operate in the input mode or the output mode.

18. The slave device of claim 14, wherein the first and second state machines generate output enable signals that control operational state of the first and second bus drivers.

19. A system, comprising:
a plurality of buses;
a plurality of master devices connected to the buses; and a plurality of slave devices connected to the buses, at least one of the slave devices including:
  a plurality of bus drivers for communicating on the buses during a plurality of operational modes, the bus drivers receiving signals from the buses during an input mode of the operational modes and transmitting signals on the buses during an output mode of the operational modes,
  bus logic configured to:
    monitor the operational modes of the bus drivers, and
    detect changes between the input mode and the output mode, and
  watchdog logic configured to:
    determine whether a predetermined time period elapses after a change from the input mode to the output mode, and
    change the operational mode of at least one of the bus drivers to the input mode when the predetermined time period elapses after a change from the input mode to the output mode.

20. The system of claim 19, wherein the bus logic includes:
  a first state machine configured to control operation of a first one of the bus drivers, and
  a second state machine configured to control operation of a second one of the bus drivers, the second state machine being independent of the first state machine.

21. The system of claim 20, wherein the first and second state machines generate direction signals that control whether the first and second bus drivers operate in the input mode or the output mode.

22. The system of claim 21, wherein the bus logic further includes:
  a watchdog state machine configured to monitor the direction signals from the first and second state machines.

23. The system of claim 21, wherein the watchdog logic is configured to assert a disable signal when the predetermined time period elapses after a change from the input mode to the output mode; and
  wherein the bus logic further includes:
    first and second logic gates configured to perform logical operations on the disable signal and the direction signals to control whether the first and second bus drivers operate in the input mode or the output mode.

24. The system of claim 20, wherein the first and second state machines generate output enable signals that control operational state of the first and second bus drivers.

25. A network device, comprising:
  a plurality of system buses;
  a plurality of routing engines;
  a plurality of controllers connected to the routing engines and the system buses;
  a plurality of slave devices connected to the system buses, at least one of the slave devices including:
    a plurality of bus drivers for communicating on the system buses during a plurality of operational modes, the bus drivers receiving signals from the system buses during an input mode of the operational modes and transmitting signals on the system buses during an output mode of the operational modes,
    bus logic including:
      a plurality of independent state machines configured to control operation of the bus drivers, and
      a watchdog state machine configured to monitor signals from the state machines to detect changes between the input mode and the output mode, and
    watchdog logic configured to change the operational mode of at least one of the bus drivers to the input mode when a predetermined time period elapses after a change from the input mode to the output mode.

* * * * *